Sept. 22, 1970     W. SIMON ET AL     3,530,466
COMPATIBLE RADAR MTI CORRELATION SYSTEM
Filed Jan. 29, 1969     3 Sheets-Sheet 1
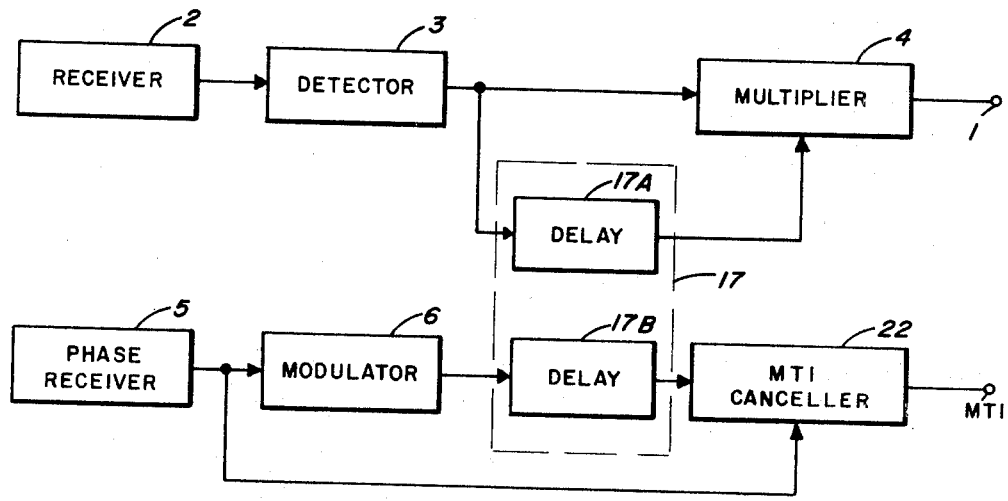
FIG. 1
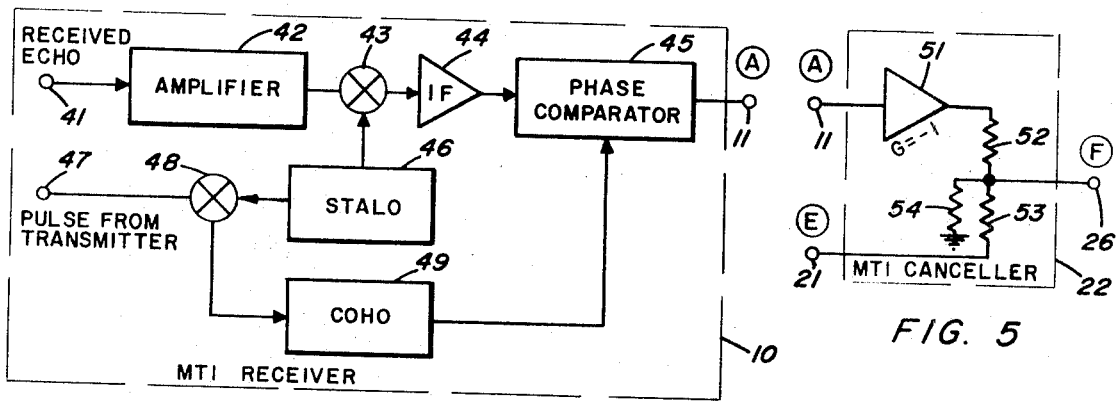
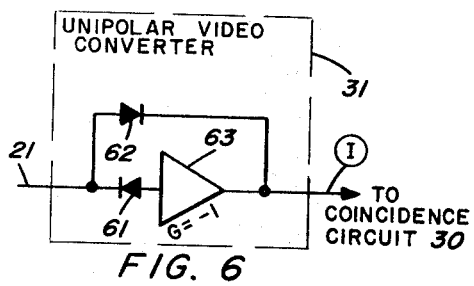
INVENTORS
WALTER SIMON
WILLIAM D. RAYNOR

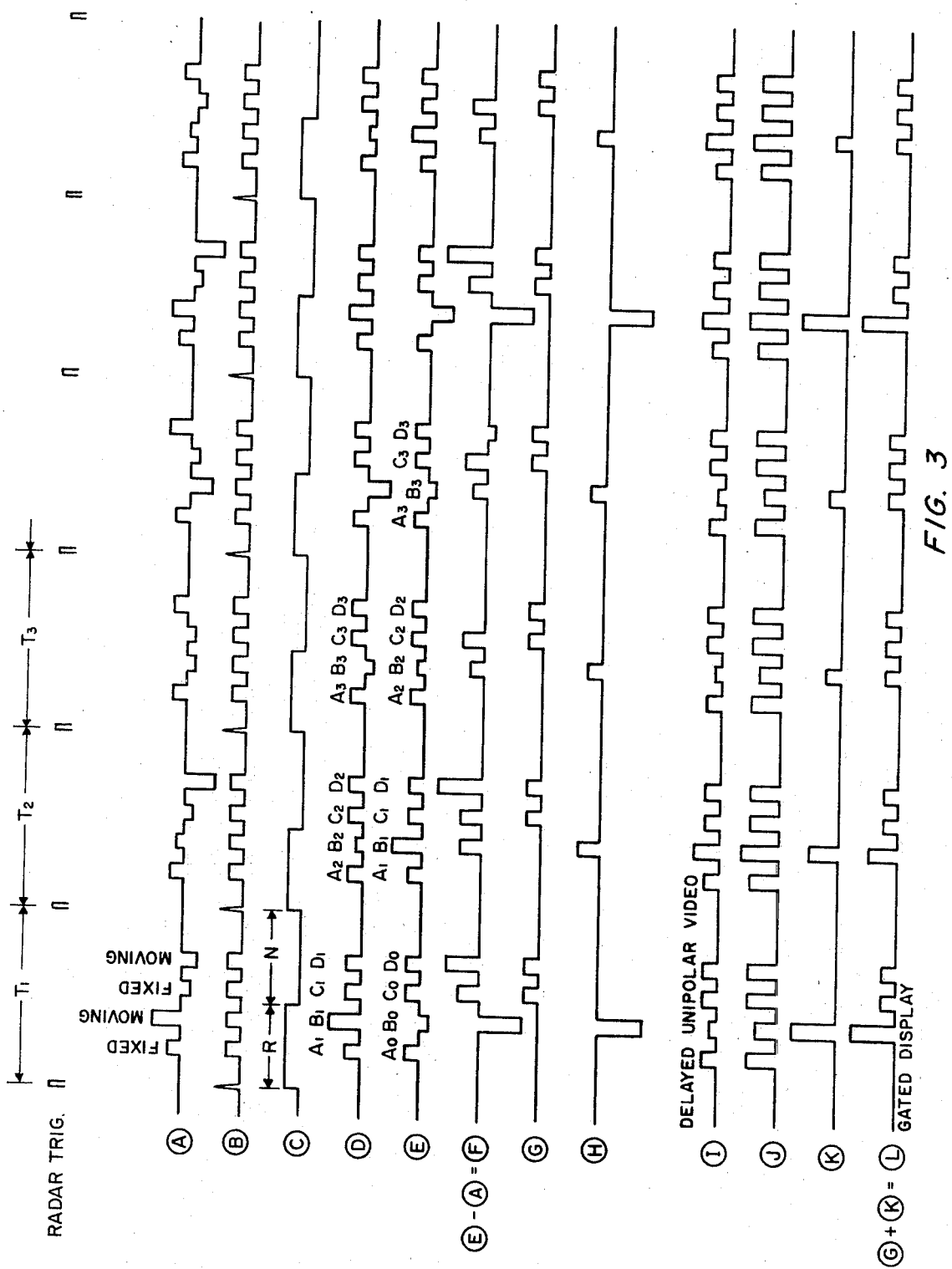

United States Patent Office 3,530,466
Patented Sept. 22, 1970

3,530,466
COMPATIBLE RADAR MTI CORRELATION SYSTEM
Walter Simon, Silver Spring, Md., and William D. Raynor, Manassas, Va., assignors to the United States of America as represented by the Secretary of the Navy
Continuation-in-part of application Ser. No. 668,300, Sept. 13, 1967. This application Jan. 29, 1969, Ser. No. 794,966
Int. Cl. G01s 9/42
U.S. Cl. 343—7.7                                8 Claims

ABSTRACT OF THE DISCLOSURE

A method for the utilization of a single delay line and existing MTI circuitry for both MTI and video correlation use in systems possessing an MTI capability. Normal video and MTI video are alternately fed to the delay line and then by gating circuits and cancellation circuits both gated MTI video and correlated video outputs are produced.

CROSS-REFERENCE TO RELATED APPLICATIONS

This case represents a continuation-in-part application of copending application Ser. No. 668,300, filed Sept. 13, 1967, for Compatible Radar MTI Correlation System, now abandoned.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Field of the invention

The present invention relates to a radar system and, more particularly, to a radar system for eliminating interference by the use of a single delay line and MTI circuitry for both MTI and video correlation in the same system.

Interference between radar systems is becoming increasingly important due to crowding of the frequency spectrum as more and more systems become operative. The difficulty arises from the fact that radiation from one unit entering a given system can partially or totally obscure the presentation of desired signals from another unit. At times there is so much overlap between units themselves that none of them can effectively operate, so a method of separating the signals from the various units is always desirable. One way in which the interference problem can be solved is by utilizing some characteristic of a given system which is peculiar only to that system, i.e., a characteristic not possessed by the other interference systems and by using this peculiar characteristic to identify the desired system. One method of utilizing some peculiar characteristic of a system to avoid interference is the utilization of a video correlator which uses the repetition rate of the given system to distinguish desired from undesired signals.

Description of the prior art

Correlation techniques have been widely utilized in the prior art in signal processing systems which utilize signals in the form of pulses or a sequence of pulses. Such techniques are most often utilized in radar systems to enhance the resolving power of the radar between closely spaced targets and particularly when wide pulse widths are utilized to increase the average power transmitted by the radar. Usually, the reflected signal is processed by obtaining the product of code elements of the received signal and code elements of a locally generated waveform of the same waveform and period as the transmitted signal and integrating this product. The ideal output from such correlation would be a single peak of high amplitude which has a width substantially narrower than the pulse width of the transmitted pulse. Since this ideal waveform has been obtained only by great difficulty by specific coding of the transmitter pulse, most systems in use today provide outputs having spurious peaks in addition to the desired high amplitude peak which indicates a target. The presence of the spurious peaks is undesirable in that the resolving power of the radar is affected with respect to targets which are relatively closely spaced.

Many prior art devices attempted to eliminate interference by the mere addition of a correlator to a previously known system. However, the addition of this correlator required the installation of the following electronic units:

(1) a video amplifier and coincidence circuit,
(2) oscillator and modulator chassis,
(3) a delay line, and
(4) an IF strip and detector chassis.

However, the addition of video correlation to a system is a complicated and expensive task, the delay line alone costing in the vicinity of a thousand dollars. Furthermore, other prior art radar systems possessing an MTI capability and already having a delay line system were not satisfactory due to the fact that the existing MTI delay lines were not used for correlating techniques because of the necessity for keeping the MTI information separate from normal radar signals. These systems would have required the addition of a correlator to the MTI system requiring installation of a dual, matched-pair of delay lines, thereby doubling the expense as shown in other situations.

SUMMARY OF THE INVENTION

The present invention offers considerable improvement over the prior art devices by providing a method for the utilization of a single delay line and existing MTI circuitry for both MTI and video correlation use in systems possessing an MTI capability. In the present invention the existing delay line is time shared between the MTI and correlated video information, the normal video and MTI video both being alternately fed to the delay line, compared to new signals and emerge as both correlated video and gated MTI video.

An object of the present invention is the provision of a compatible radar MTI correlation system.

Another object of the present invention is the provision of a radar MTI correlation system wherein the existing delay line is time-shared between the MTI and normal video pulses.

Still another object of the present invention is the provision of a correlation system which acts to reduce interference between similar radar systems.

Another object of the present invention is the provision of a correlation system wherein radiation from one unit is prevented from partially or totally obscuring the presentation of desired signals in another unit.

Another object of the present invention is the provision of a correlation system wherein interference is eliminated through the utilization of some peculiar characteristic of one of the systems.

Other objects, advantages and novel features of the present invention will become apparent from the following detailed description of the invention when considered in conjunction with the accompanying drawings.

BRIEF DESCRIPTION OF THE DRAWINGS

FIG. 1 shows simplified block diagrams of correlated video and MTI systems when operating independently and before being combined, as in the present invention;

FIG. 3 shows waveforms generated by the system;

FIG. 4 shows a block diagram of the circuit making up the MTI receiver;

FIG. 5 shows a typical circuit for an MTI canceller; and

FIG. 6 shows a typical circuit for a unipolar video converter.

DESCRIPTION OF THE PREFERRED EMBODIMENTS

Figure 2:
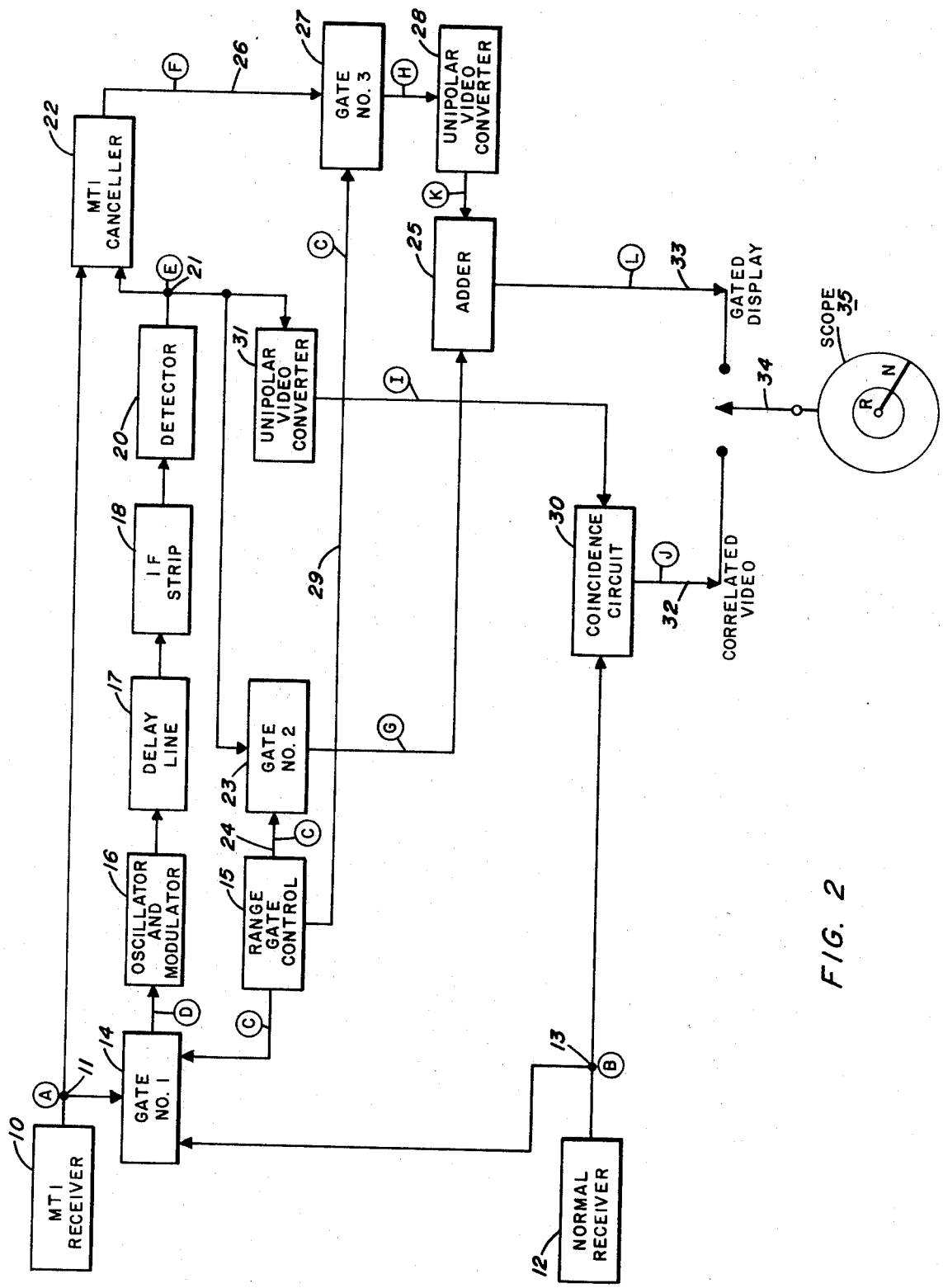
FIG. 2 shows a block diagram of the compatible radar MTI correlation system.

Turning now to FIG. 1 of the drawings, there is shown a block diagram presentation of how a correlated video and a MTI video system would have operated under prior art conditions, before they have been integrated into a compatible MTI correlated system as disclosed by the present invention. In FIG. 1 the correlated video circuit consists of a normal video receiver 2, which feeds a detector 3 whose output divides into a delay line 17A and into multiplier 4. After the signal has been delayed one pulse repetition period by delay line 17A it also feeds into multiplier 4, where it is multiplied by the undelayed signal to produce a correlated video output signal.

In the MTI circuit the receiver 5 is phase oriented, to show a phase difference between the transmitted and received pulses when there is movement by the target. The output of receiver 5 divides to feed a modulator 6 and delay line 17B before going to an MTI canceller 22. An undelayed signal from receiver 5 is subtracted from the delayed signal from 17B by canceller 22 to produce an MTI output.

From these two systems it can be seen that while they both operate to enhance the received signal each one utilizes a delay line of its own.

In the present invention only one delay line is used (as shown by the dotted lines as delay line 17) and the two systems time-share this delay line as will be fully described hereinafter.

Referring now to FIG. 2 of the drawings, there is seen a radar MTI receiver 10 (shown in detail in FIG. 4) which is connected to a junction 11, the output of this junction being in turn connected to a first gate circuit 14. There is also provided a normal radar receiver 12 whose output is connected to a junction 13, the output of this junction in turn also being connected as an input to gate circuit 14. Connected so as to form a third input for gate circuit 14, there is provided a manually adjustable operator-controlled range gate circuit 15, which may be a hand-cranked potentiometer, or any other well-known means for producing a range step on a display scope. The output of gate circuit 14 is applied to an oscillator and modulator circuit 16 and then to a delay line 17 as well as an IF strip 18 and detector 20 so that a signal is finally impressed on junction 21. From junction 21 the signal divides, part going as one input to an MTI cancellation circuit 22 which will be described in more detail in connection with FIG. 5 and another part going as an input to a second gate circuit 23. Also forming an input to cancellation circuit 22 is the undelayed MTI video signal from receiver 10 as impressed on junction 11.

Range gate circuit 15 has several outputs one of which is impressed upon lead 24, this lead being used to apply control signals to second gate 23 so that the output of gate 23 is applied to an adder circuit 25. The second component which is summed by the adder circuit 25 consists of a signal from the output of cancellation circuit 22, this output being fed along lead 26 to a third gate circuit 27 and a unipolar video converter 28 (shown in detail in FIG. 6) before being impressed on adder 25. The control potential which activates third gate 27 is supplied as another output of range gate circuit 15 over lead 29. A coincidence circuit 30 forming another element of the system has two inputs and a single output. One input is the normal video as present at junction 13 while the other is the signal appearing at junction 31, after it has been modified by a unipolar video converter 31 and then fed to coincidence circuit 30.

From the above description of the circuitry shown in FIG. 2 it can be seen that the system disclosed produces two different outputs; namely, the output from coincidence circuit 30 as appearing on lead 32 which takes the form of a potential correlated video and the output from adder 25 as appearing on lead 33 which takes the form of a gated video display.

Leads 32 and 33 are connected to the contacts of a two-position switch 34, the arm of which is connected to a display device, shown here as an oscilloscope 35. A description of the presentation shown on scope 35 will be given more fully hereinafter.

In FIG. 4 there is shown a typical circuit such as would be found in MTI receiver 10 (FIG. 2). Here a received echo, such as, for example, in the order of 1300 megacycles, would be applied to input terminal 41, from where it would go to an amplifier 42, then to a mixer 43, an IF amplifier 44, and finally to a phase comparator 45. Pulses from the transmitter would be present on input terminal 47 and they too would be in the order of 1300 megacycles. These pulses would pass to mixer 48 where they are beaten with an output from continuous running stable local oscillator 46. STALO 46 operates at 1360 megacycles and also feeds mixer 43 with the result that a 60 megacycle IF frequency is developed. The output from mixer 48, which in effect is a trigger from the transmitter, is used to trigger a coherent oscillator 49, the output of which also goes to phase comparator 45. Since receiver 10 is an MTI receiver, it is phase oriented and therefore phase comparator 45 compares the phase of the returned echo with the phase of the transmitter to permit subsequent determination of whether or not the target has moved. The ouput of phase comparator 45 is applied to junction 11 (FIG. 2).

Detail for a typical MTI canceller is shown in FIG. 5. Here the signal from junction 11 (FIG. 2) is applied to an amplifier 51, having a gain of minus one (−1), the output of which feeds one end of a resistor 52, the other end being tied to ground through another resistor 54. The second input is derived from junction 21 (FIG. 2) and is tied to a resistor 53, resistors 52, 53 and 54 being connected to form a voltage divider network. Output for MTI canceller 22 is obtained from the injunction of resistors 52 and 53 and this output is connected to lead 26. From the circuit of FIG. 5 it is obvious that one input signal is subtracted from the other input signal with the signal representing the difference between the two being impressed on lead 26.

The circuitry of FIG. 6 shows the structure of a typical unipolar video converter, such as components 28 and 31 of FIG. 2. A unipolar converter, as used herein, is a circuit which takes an input made up of positive and negative pulses and inverts the negative pulses so that the output has the same number of pulses as the input, but they are all positive. Thus, the input to converter 31 is derived from junction 21, from whence the signal is applied to a pair of rectifiers 61 and 62, poled in opposite directions. Rectifier 62 has its cathode connected directly to the output while rectifier 61 has its anode connected to an amplifier 63 having a gain of minus one (−1). The output of amplifier 63 joins with that of rectifier 62 and the combined signals are applied to coincidence circuit 30.

Turning now to the operation of the invention and at the same time referring to the waveforms of FIG. 3, it will be observed that waveforms A and B denote the outputs of the MTI receiver 10 and the normal video receiver 12. It should be noted that waveforms A, which represent the output of phase oriented, MTI receiver 10, may be a mixture of fixed and moving targets and that the pulses vary in polarity and amplitude during each pulse period, depending upon whether some of the targets have moved or not. Waveforms B which indicate only normal video returns are always the same amplitude and same polarity from pulse period to pulse period. Waveforms A and B are applied to gating circuit 14 via junctions 11 and 13, respectively, gating circuit 14 in turn being activated by means of a gating pulse C, derived from range gate circuit 15, alternately feeding waveforms A and B to point D. Point D now consists of the composite, chopped waveforms A and B.

The gating pulse C is derived from the radar MTI range gate 15, which is controlled by the operator. Gate length R of waveforms C, FIG. 3, is the range within which the operator desires to have MTI information presented. At ranges greater than R, normal video information is fed to the indicators as denoted by region N. Thus, it can be seen in waveform D, that the first two pulses, $A_1$ and $B_1$ and as passed by gating circuit 14 due to range gate R, are the first two pulses from waveform A, while the second two pulses, $C_1$ and $D_1$, as passed by gating circuit 14 due to range gate N, are the last two pulses from waveform B.

Waveform D is fed to the radar delay line system consisting of oscillator modulator 16, delay line 17, IF strip 18 and detector 20 where the signal emerges at point E or junction 21, delayed one pulse period. Note in FIG. 3 that waveform E shows the delay by having pulses $A_1$, $B_1$, $C_1$ and $D_1$ now during the second or $T_2$ pulse period. Pulses $A_0$, $B_0$, $C_0$ and $D_0$ are pulses which actually occurred before period $T_1$, but which when delayed now show up during $T_1$. Waveform E consists of the detected, delayed video. Waveform E is now fed to the radar MTI cancellation circuit 22, together with the undelayed, bipolar video waveform A via junction 11. Waveform F which consists of waveform E minus waveform A, appears on lead 26, the output of the cancellation circuit 22 and consists of MTI video in region R and an undesired video signal in region N.

Since the signals appearing at junction 21 and having the waveform of E, are both MTI and normal video signals, and they have both been delayed by delay line 17, the time now has arrived for them to be separated so that the two desired outputs; namely, a correlated video output and a gated MTI display, can be obtained. It should be recalled, at this point, that the range gate control 15 is so designed that during the range period R (waveform C, FIG. 3) the gates will pass only MTI video signals and during the range period N the gates will pass only normal video signals.

The gate of waveform C as produced by range gate circuit 15 is applied by gate 23 to waveform E. Gate 23 is opened by the N gate only and waveform G results, which consists solely of the desired normal video in region N, delayed by one pulse period. The gate of waveforms C is also applied over lead 29 to waveform F by gate 27, which is opened by the R gate only. The undesired video in region N of waveform F is thus eliminated, as shown in waveform H, this being a gated MTI video output and is connected to unipolar video converter 28. It should be noted that gates 14 and 23 have served together with the MTI cancellation circuit 22 to channel the chopped component in regions R and N of waveform E to the MTI comparison circuits and the correlation circuits, respectively.

Waveform H, after passing through unipolar video converter 28 and reversing its polarity emerges as waveform K, where it is applied as one input to adder 25, the other input being waveform G. Waveforms G and K are combined in adder 25 and thus produce an output lead 33 waveform L which consists of gated MTI during region R of waveform C and normal video during region N of waveform C. The signals on lead 33 are applied to switch 34 which functions to connect these gated MTI signals to display scope 35, if desired.

Delayed normal and MTI video, as appearing at junction 21, waveform E, is passed through a unipolar video converter 31, where it emerges in the configuration of waveform I, this being delayed unipolar video. Normal video as produced by receiver 12 and appearing at junction 13, is compared with the delayed video I in coincidence circuit 30 and emerges as potential correlated video, waveform J on lead 32. The signal on lead 32 is also applied to one set of contacts of switch 34 so that it may be presented on scope 35, if desired.

The signal on lead 32, waveform J, has been identified as potential correlated video. A dictionary of electronics and nucleonics defines a correlator as "a device that detects weak signals in noise by performing an electronic operation approximating the computation of a correlation function." It is noted that computation of a correlation function requires the integration of the product of two functions, one delayed with respect to the other, over a sufficiently long period of time to approximate the ideal. Thus, in the present invention there is a true correlation and once the signal on lead 32 has been displayed on scope 35 this display is a true correlated video. This is so because two functions, waveforms B and I, one of which has been delayed, waveform I, with respect to the other, waveform B, have been multiplied together by coincidence circuit 30, with the phosphor or persistence in the scope 35 performing the integration.

The oscilloscope 35 is shown in FIG. 2 as having two concentric rings, one having a radius R and the remaining distance to the edge labeled N. These distances are determined by range gate control 15, waveform C, FIG. 3, and by adjustment of a hand crank, the operator can extend R until it fills the entire scope face, with no N showing, or he can fill the entire scope with all N and no R showing. Since the range gate R determines what part of the pulse period $T_1$, $T_2$, etc., that MTI video is applied to the delay line, then if R extends over the whole period then nothing but gated MTI is displayed on scope 35. On the other hand, if the range control is cranked so that range gate N takes up the entire pulse period, then only correlated video will be displayed on scope 35.

From the above description of the structure and operation of the inventioin, it is clear that the device offers many improvements over similar prior art systems. By time sharing a single delay line and existing MTI circuitry for both MTI and video correlation use the invention offers an inexpensive means of eliminating interference between similar radar systems, the interference being eliminated through the use of the repetition rate of a given system to distinguish desired from undesired signals.

Obviously many modifications and variations of the present invention are possible in the light of the above teachings.

What is claimed is:

1. A compatible radar MTI correlation system comprising
   means for receiving MTI video signals;
   means for receiving normal video signals;
   a delay line systems;
   first gate means for alternately applying the MTI and the normal video signals to the delay line system;
   an MTI cancellation circuit for subtracting the output of the delay line system and the undelayed MTI video signals;
   an adder circuit for summing the outputs of the delay line system and the cancellation circuit;
   a coincidence circuit for comparing the outputs of the delay line system and the normal video receiving means;
   a first output terminal connected to the adder for supplying gated display signals;
   a second output terminal connected to the coincidence circuit for supplying correlated video signals;
   switch means connected to the first and second output terminals; and display means connected to the switch means for presenting either gated displays or correlated video.

2. The system of claim 1 wherein there is a second gate means between the output of the delay line system and the adder.

3. The system of claim 2 wherein there is a third gate means connected to the output of the MTI cancellation circuit.

4. The system of claim 3 further including an adjustable range gate means for controlling the operation of the first, second and third gate means.

5. The system of claim 4 further including a first unipolar video converter connected between the output of the delay line system and the coincidence circuit.

6. The system of claim 5 further including a second unipolar video converter connected between the third gate means and the adder.

7. The system of claim 6 wherein the delay line system includes an oscillator and modular, delay line, IF amplifier and detector.

8. The system of claim 7 wherein the displaying means is a cathode ray tube and wherein by adjustment of the range gate means the display means can display either correlated video or gated displays.

References Cited

UNITED STATES PATENTS

| | | | |
|---|---|---|---|
| 3,032,717 | 5/1962 | Fowler et al. | 343—7.7 X |
| 3,064,251 | 11/1962 | Diamond | 343—7.7 |
| 3,254,339 | 5/1966 | Schwab | 343—17.1 |

RICHARD A. FARLEY, Primary Examiner

T. H. TUBBESING, Assistant Examiner

U.S. Cl. X.R.

343—17.1